UNITED STATES PATENT OFFICE.

GABRIEL NEUDECKER, OF RICHMOND, VIRGINIA.

IMPROVEMENT IN PROCESS OF PREPARING TOBACCO.

Specification forming part of Letters Patent No. 70,012, dated October 22, 1867.

*To all whom it may concern:*

Be it known that I, GABRIEL NEUDECKER, of Richmond, in the county of Henrico and State of Virginia, have invented a new and useful Improvement in the Process of Preparing Tobacco for Market; and I do hereby declare that the following is a full, clear, and exact description thereof.

To enable others skilled in the art to use my invention, I will give a brief description of the old process previous to describing the new.

My invention has reference more particularly to the preparation of what is commonly known as "black tobacco," but is also applicable to other grades of plug or bar tobacco.

According to the old process the tobacco is formed into "lumps," as they are termed, but might more properly be called "rolls," their shape being in the proportions of one foot in length by two in diameter, or thereabout, or of any other desired size in similar proportions. These lumps are then placed in layers and pressed in molds, from which they are taken and packed in the box, under moderate pressure, and nailed up for shipment; but under this process the package must not be opened in less time than two months, otherwise the lumps will swell and dry in flakes. Furthermore, under this process, the factories necessarily have to stop work in the winter, because at that season the tobacco thus prepared will mold and spoil. To obviate these difficulties, and at the same time to improve the quality and appearance of the marketable article, is the object of my invention, the process of which is as follows: The preparation of the tobacco previous to the formation of the lumps is the same in my process as heretofore. It is therefore unnecessary to give any detailed description of it here. The lumps then, being formed in size and shape as before described, are pressed in molds, whence they are removed, and packed under moderate pressure, but in a strong iron-bound case, instead of in the box in which it is to be shipped. In this condition it is placed in what is termed a "sweat-house," where it is subjected to a temperature of about 120° Fahrenheit for from six to twelve days, varying according to the condition of the tobacco and the state of the weather, until all tendency to vegetable fermentation is destroyed. The case is then withdrawn from the sweat-house, and, while hot, unpacked and repressed in the molds, and then packed and pressed in a suitable box for shipment.

The effect of this sweating process is to dissolve and diffuse more thoroughly the flavoring matter used in the preparation of the tobacco, and thus improve its color and quality, to destroy its tendency to swell, and to prevent any risk of spoiling by mold—the result of vegetable fermentation, arising from the absorption of moisture from the atmosphere in the winter season, for which the plant has a natural affinity, while the repressing and repacking add much to the appearance and preservation of the manufactured article.

I am aware that packed tobacco has been subjected to heat when first packed and ready for shipment; but, owing to its liability to burst or open seams in the boxes, and to mold where in contact with the wood, that practice has been abandoned, This, therefore, I do not claim; but

What I claim as new, and desire to secure by Letters Patent, is—

The process herein described of manufacturing tobacco—*i. e.*, by subjecting the pressed tobacco to a temperature of about 120° Fahrenheit until all tendency to vegetable fermentation is destroyed, and then repressing and repacking in fresh cases, substantially as and for the purposes set forth.

In testimony whereof I hereunto subscribe my name this 10th day of June, 1867.

GABRIEL NEUDECKER.

Witnesses:
W. MORRIS SMITH,
SYDNEY E. SMITH.